United States Patent [19]

Eng

[11] 4,198,611
[45] Apr. 15, 1980

[54] REDUNDANCY SYSTEM WITH EIGHT DEVICES FOR FIVE CHANNELS

[75] Inventor: Kai Yin Eng, Irvington, N.J.

[73] Assignee: RCA Corporation, New York, N.Y.

[21] Appl. No.: 820,934

[22] Filed: Aug. 1, 1977

[51] Int. Cl.² ............................................. H01P 1/10
[52] U.S. Cl. ................................ 333/105; 330/124 D; 333/2
[58] Field of Search .................................. 333/1-3, 333/6, 7 R, 7 D; 330/124 D; 340/147 SC; 325/2, 120, 156, 157; 307/23, 64, 65

[56] References Cited

U.S. PATENT DOCUMENTS

| | | | |
|---|---|---|---|
| 3,111,624 | 11/1963 | Farkas | 333/3 X |
| 3,600,682 | 8/1971 | Yoshimoto et al. | 333/7 R X |
| 4,061,989 | 12/1977 | Petrelis | 333/7 R |

*Primary Examiner*—Paul L. Gensler
*Attorney, Agent, or Firm*—Samuel Cohen; Carl V. Olson

[57] ABSTRACT

A redundancy system for use in a communications satellite. Eight traveling wave tube amplifiers are provided for five communications channels in a manner such that full service is maintained even though any three of the amplifiers have failed. A ten-switch network connects the five channels to the inputs of the eight TWT amplifiers, and a mirror-image ten-switch network connects the outputs of the eight TWT amplifiers to the five channels.

5 Claims, 7 Drawing Figures (a) REMAINING PATHS (b) SEMI-SYNTHESIZED GRAPH (b) INTERMEDIATE STEPS IN SYNTHESIS (a) CONNECTION GRAPH (b) SYNTHESIZED GRAPH (a) A PSEUDO SOLUTION (b) FINAL SOLUTION

REDUNDANCY SYSTEM WITH EIGHT DEVICES FOR FIVE CHANNELS

Redundant traveling wave tube TWT amplifiers are needed in communications satellites to maintain service when one or more amplifiers fail. Switching networks are included and operated by command from the ground to connect a redundant amplifier in the place of one that has failed. A simple redundancy system may provide one standby amplifier for each active amplifier in a two-for-one arrangement, but this greatly increases the weight and cost of the spacecraft. Many more-economical arrangements have been proposed including the provision of three standby amplifiers for five channels in an eight-for-five arrangement. The accompanying switching network should permit the continuation of service even though up to three amplifiers have failed. It is important that the number of switches be kept to a minimum to minimize the weight added to the spacecraft and to minimize the electrical signal insertion loss caused by the switches.

Prior art arrangements are described: in an article by F. ssal, C. Mahle and A. Berman entitled "Network Topologies to Enhance the Reliability of Communications Satellites" appearing at pages 309–322 of the Comsat Technical Review, Vol. 6, No. 2, Fall 1976; and in RCA Technical Note No. 1182 by H. J. Moody and V. Shukla entitled "Redundancy Switching of Amplifiers in Satellites" dated June 10, 1977.

According to an example of the invention, a superior redundancy system is provided which employs eight devices, such as TWT amplifiers, for five channels, and which requires only ten input switches and ten output switches.

Figure 1:
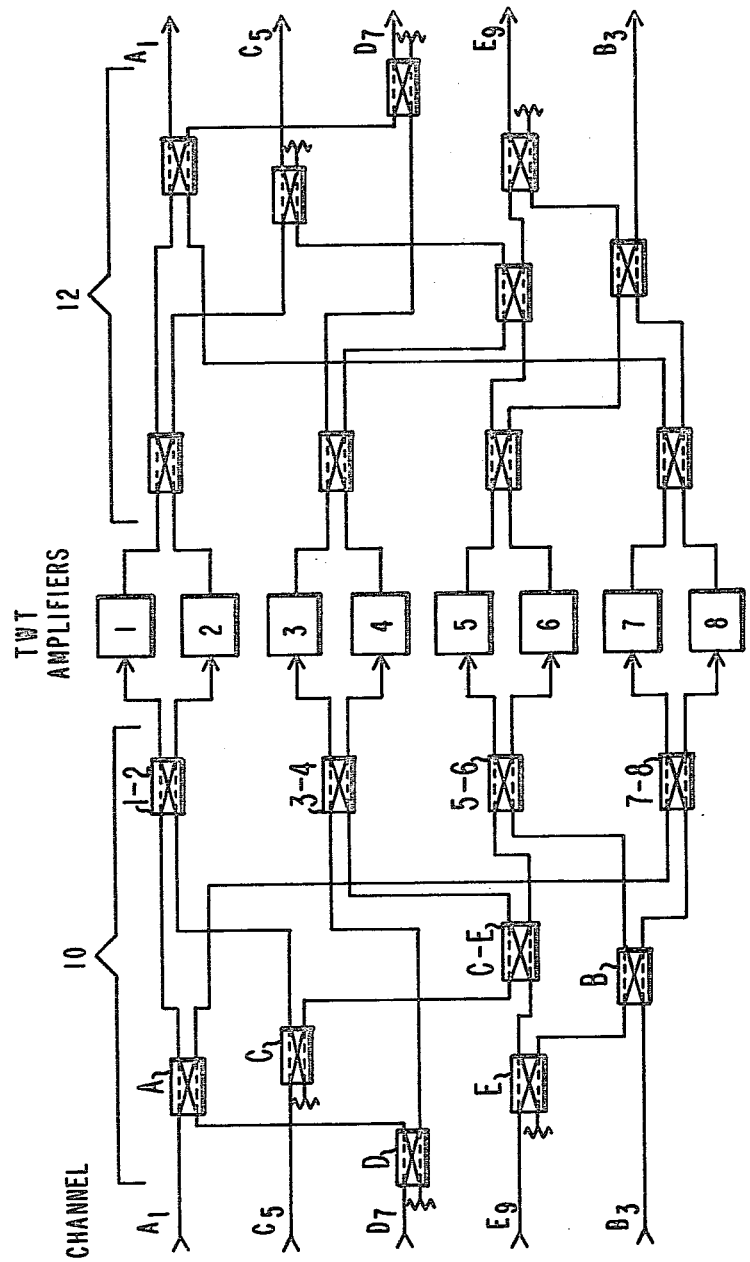
FIG. 1 is a schematic diagram of a redundancy system according to the teachings of the invention.

In FIG. 1, eight traveling wave tube amplifiers 1 through 8 have inputs connected through an input switching network 10 with five channels $A_1$, $C_5$, $D_7$, $E_9$ and $B_3$, and have outputs connected through a mirror-image switching network 12 to the same five channels. The subscripts used for the five channels A through E are intended to reflect a preferred arrangement of channel frequency assignments in which the five channels have odd numbered frequency bands 1, 3, 5, 7 and 9 separated by even numbered frequency bands employed by other apparatus. The channel $B_3$ is located out of alphabetical order in FIG. 1 for the purpose of simplifying the cross connections in the drawing of the switching networks 10 and 12.

The switches in switching network 10 are labeled A, B, C, D, E, C-E, 1-2, 3-4, 5-6 and 7-8 according to an arbitrary scheme as follows: Switches A through E are connected with channels $A_1$ through $E_9$. Switch C-E is connected with switches C and E. Switches 1-2 are connected with amplifiers 1 and 2. Similarly, switches 3-4, 5-6 and 7-8 are connected with amplifiers 3 and 4, 5 and 6, and 7 and 8, respectively.

All the switches shown in FIG. 1 are transfer switches represented by a symbol indicating that the two inputs of a switch may be connected by the switch to a respective two outputs of the switch, or to two transposed outputs of the switch. Switches C, D and E are shown with a termination at an unused port so that every unused TWT amplifier is properly terminated at both its input and its output. All switches except switches C, D and E are required to be transfer switches. Switches C, D and E may be single-pole-double-throw switches if desired for weight-saving purposes. The switches may be of known waveguide or coaxial line constructions, manufactured by Transco Products, Inc. 4241 Glencoe Avenue, Venice, CA 90291. For example, the transfer switches may be Transco Type HO coaxial switches or Transco Type GR waveguide switches. Single-pole-double-throw switches may be Transco Type DO coaxial switches or Teledyne Microwave Type WS waveguide switches, manufactured by Teledyne Microwave Co., 1290 Terra Bella Avenue, Mt. View, CA 94043.

As can be seen from FIG. 1, switches A, 1-2 and 7-8 connect channel $A_1$ with amplifiers 1, 2, 7 or 8; switches B, 5-6 and 7-8 connect channel $B_3$ with amplifiers 5, 6, 7 or 8; switches C, C-E, 1-2, 3-4 and 5-6 connect channel $C_5$ with amplifiers 1, 2, 3 or 5; switches D, A, 1-2, and 3-4 connect channel $D_7$ with amplifiers 1, 2, 3 or 4; and switches E, C-E, B, 3-4 and 5-6 connect channel $E_9$ with amplifiers 3, 4, 5 or 6.

The switching network 12 is seen to be an exact mirror image of the switching network 10.

The redundancy switching system shown in FIG. 1 is operative, and has advantages of economy not possessed by prior art arrangements, and is an optimum solution to the problem for reasons which are unobvious. The disclosed arrangement could not be arrived at by trial-and-error, but was arrived at following a rigorous mathematical procedure described in the following Appendix.

APPENDIX

The redundancy switching network problem can be formulated in terms of graph theory. This has the advantages of using the formal language of mathematics, and the analysis may be implemented by the use of digital computers.

Figure 2:
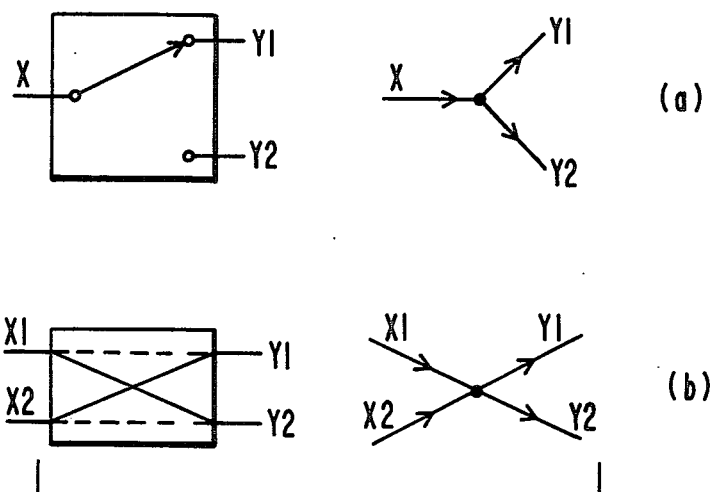
FIG. 2 is a diagram illustrating symbols used in FIG. 1.

In an N devices-for-C channels configuration, we represent the C input ports as C input vertices and N output ports as N output vertices. For the SPDT and transfer switches, they may be modelled as vertices of either degree 3 or 4 as shown in FIG. 2. Note that the edges are directed so that the inputs may be distinguished from the outputs. Furthermore, the inherent logic of connection is implied in the graphical representation. That is to say, for example, X is connected to either Y1 or Y2 but not simultaneously for the SPDT switch. As for the transfer switch, if X1 if connected to Y1, then X2 must be connected to Y2 and vice versa. Also note that the input vertices must be of out-degree 1 and output vertices of in-degree 1. The problem is now how to design a graph which consists of vertices of degree 3 or 4 to connect the C input vertices to the N output vertices so that any (N-C) output vertices may be deleted, and the C input vertices are connected to C different output vertices with no common edges between these paths.

Before we proceed to synthesize the graph representing the switch network, we must first decide which input vertices would be connected to which output vertices. This again may be represented by a graph consisting of only C input vertices and N output vertices and with edges connecting between them to denote connecting paths. Denoting (N−C) by F, it is easy to see that for any input vertex, it must be connected to at least (F+1) output vertices so that F output vertices may fail, and there is still at least one surviving path. Extending the same idea to any two input vertices, they must be connected to at least (F+2) output vertices. Note that among these (F+2) output vertices, at most F of them are connected to the two input vertices. Formalizing this rule in mathematical terms, we have the following proposition. Proposition I: In an N-For-C configuration, if full redundancy is required, a necessary and sufficient condition is that $$m(\bigcup_{i=1}^{n} B_i) \geq n + F \quad (4.1)$$

where
$B_i$ = set of output vertices connected to the i'th input vertex assuming that the input vertices are labelled from 1 to C,
m(B) = number of elements (or vertices) in a set B,
n = integer, $1 \leq n \leq C$,
F = N−C Since the labelling of the vertices is arbitrary, n=2 in equation (4.1) automatically includes the union of any pair of $B_i$ and $B_j$ for $i \neq j$.

Two more propositions are stated in the following for completeness. Proposition II: For an (N+1)-For-N configuration, the minimum solution* consists of exactly one vertex of degree 3 and (N−1) vertices of degree 4, summing to a total of N vertices (disregarding the input and output vertices). Proposition III: For an N-For-C configuration and a solution of minimum channel span, the maximum number of consecutive channels (the channels are numbered by integers from one to C) spanned by a TWTA is $$M = \begin{cases} F + 1 & F < C \\ C & F \geq C \end{cases}$$

where
F = N-C

*A minimum solution is defined as one that contains the minimim number of vertices and satisfies Proposition I.

We now proceed to illustrate the procedure whereby a network can be synthesized. We will use the 8-For-5 case as an example since it is of particular interest here. We first use Proposition I to get the connection graph. Essentially we start with $V_1$, connect it to $V_6$ through $V_9$. And then we do the same thing to $V_2$ but connect it to $V_7$ through $V_{10}$ so as not to violate Proposition I. Continuing doing this, we get the basic form of FIG. 3a. Note that $V_6$ and $V_{13}$ are of degree 1 while $V_9$ and $V_{10}$ are of degree 4 each. It is intuitive that a high congestion at a vertex will result in excessively many internal vertices for realization. (An internal vertex is one that is not an input or output vertex). To improve the situation, we change the edges ($V_1$, $V_9$) to ($V_1$, $V_{13}$) and ($V_5$, $V_{10}$) to ($V_5$, $V_1$). The improved version of FIG. 4 is thus obtained.

Figure 3:
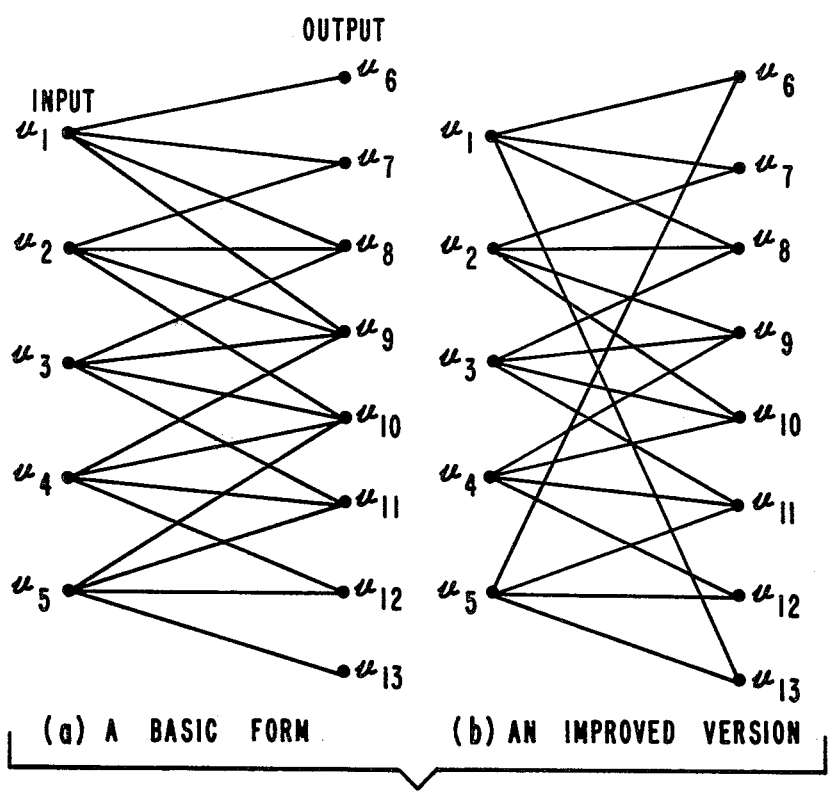
FIG. 3 are connection graphs for the 8-for-5 configuration.
Figure 5:
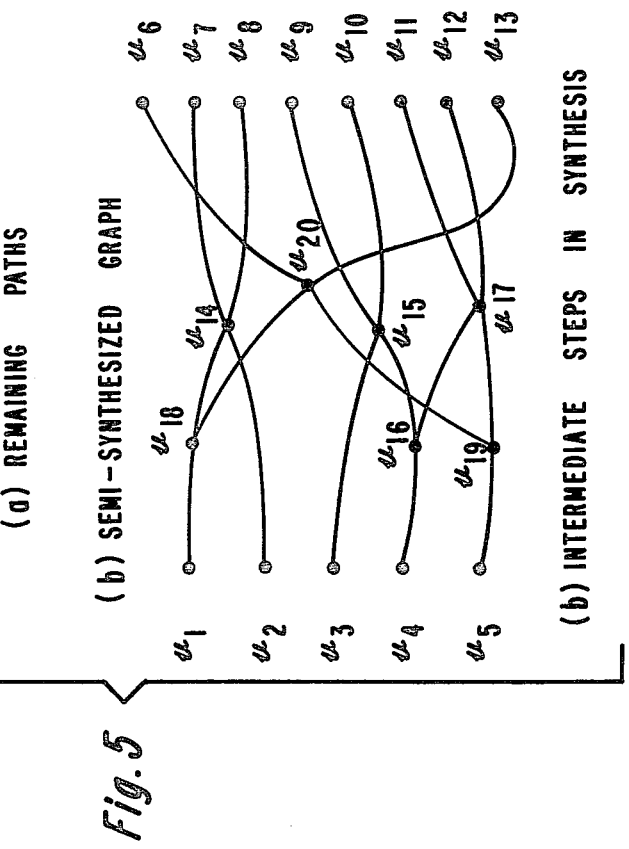
FIG. 5 are graphs illustrating an intermediate step in the synthesis.
Figure 5:
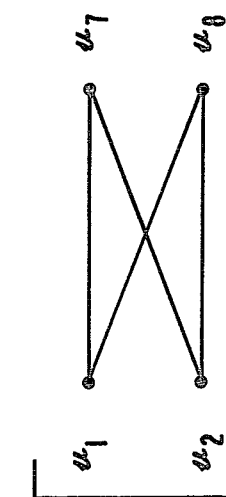
Figure 5:
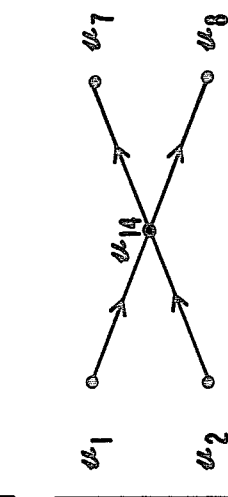
Figure 4:
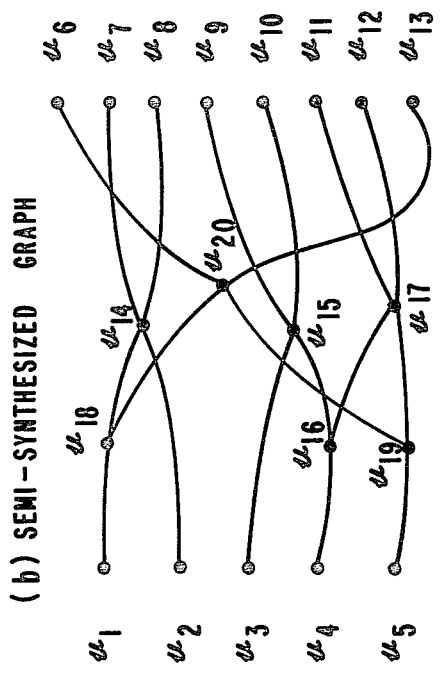
FIG. 4 are graphs illustrating the synthesizing of four paths by a single vertex of degree 4.

We now have to synthesize FIG. 3b by using vertices of degree 3 and (or) 4. Consider the connections between $V_1$, $V_2$, $V_7$ and $V_8$ (FIG. 4a). We may synthesize these connections by a single vertex of degree 4 (FIG. 4b). The addition of $V_{14}$ thus eliminates four paths in FIG. 3b. Similarly, $V_{14}$ through $V_{20}$ are added sequentially, and the remaining paths and the semi-synthesized graph are shown in FIG. 5 (where the orientations are not shown for simplicity). Note that $V_{16}$, $V_{18}$ and $V_{19}$ are added in order to keep the degree of the input vertices to be one.

Figure 6:
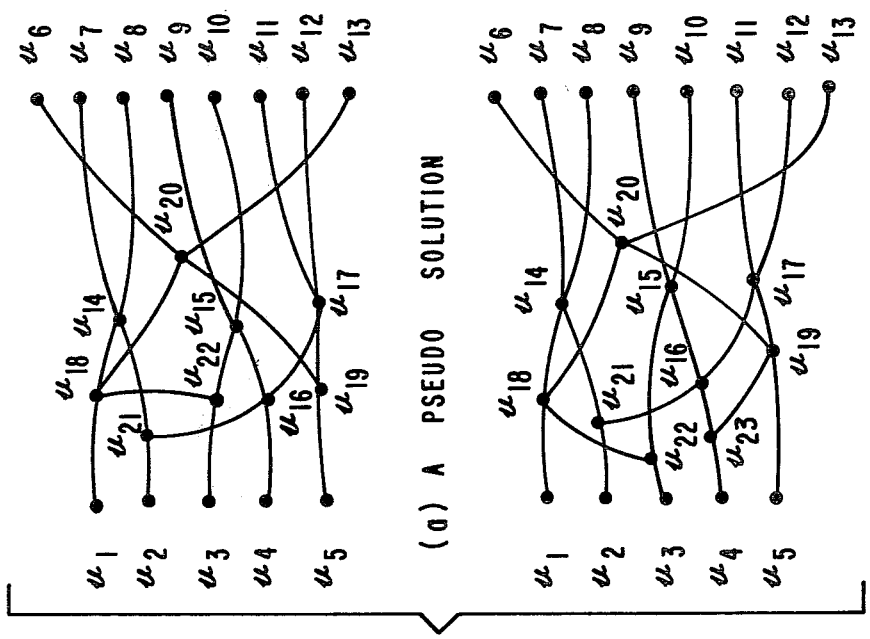
FIG. 6 are graphs of pseudo and final solutions.

Next step is to try to connect $V_2$ to $V_9$ and $V_{10}$. We are forced to add a vertex $V_{21}$ between $V_2$ and $V_{14}$ in order to bring a line out and keep the degree of $V_2$ to be one. If it goes to $V_9$ and $V_{10}$ directly, a vertex has to be added between $V_9$ and $V_{15}$, and another one between $V_{10}$ and $V_{15}$. But note that $V_{16}$ is only of degree 3, and it does lead to $V_9$ and $V_{10}$. It is thus sensible to go from $V_{21}$ to $V_{16}$ (FIG. 6a). Likewise, to finish the final two paths for $V_3$, $V_{22}$ is created between $V_3$ and $V_{15}$, and it is connected to $V_{18}$. In doing so, $V_3$ is connected to $V_6$, $V_7$, $V_8$ and $V_{13}$ instead of $V_{11}$ and $V_8$ as originally intended in the connection graph of FIG. 5a. This is all right since the modification does not violate Proposition I. At this point, we seem to have a solution of FIG. 6a. This solution is only a pseudo solution because as we took advantage of the connection between $V_{21}$ and $V_{16}$ as indicated above, we had created a fault. Consider the failures of $V_7$, $V_8$ and $V_9$. The possible connections to be made are: ($V_1$, $V_6$), ($V_5$, $V_{13}$) and ($V_3$, $V_{10}$). $V_2$ and $V_4$ are forced to go to $V_{11}$ and $V_{12}$. But both of them have to go through the path between $V_{16}$ and $V_{17}$. Since this is prohibited, and there is no other variation that may correct this problem, the pseudo solution has failed. The failures of ($V_2$, $V_4$, $V_5$) and ($V_3$, $V_4$, $V_5$) would create the same situation. As mentioned above, the cause of the trouble was the connection between $V_{21}$ and $V_{16}$ which destroyed the independence between some paths. The correction to this problem is quite simple. A vertex $V_{23}$ may be added between $V_4$ and $V_{16}$ connected to $V_{19}$ (FIG. 6b). Now there are altogether 10 internal vertices, and indeed it is an adequate solution.

Figure 7:
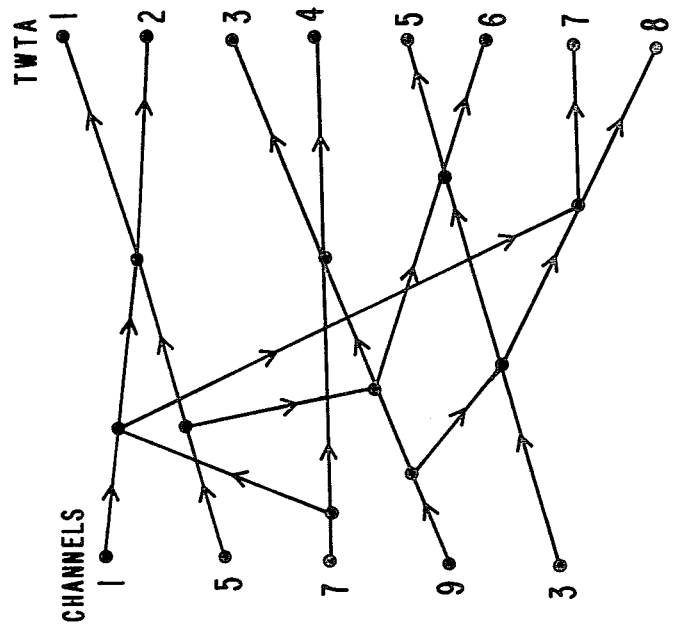
FIG. 7 is a graph of the ten-switch solution for the 8-for-5 configuration which is implemented in FIG. 1.

In order to facilitate the reading of the solution, we rearrange the graph of FIG. 6b so that minimum crossovers are attained (FIG. 7). Re-labelling of the input vertices has also been done to minimize the channels spanned by each TWTA. The channel numbers are not shown sequentially in FIG. 7 for easy drawing. In addition, the input vertices are numbered by odd integers denoting the channels (non-contiguous multiplexing), and the output vertices by integers from one to eight denoting TWTA's. The orientations of the edges are also included. Since there are 10 internal vertices representing 10 switches, this solution will be called the 10-switch solution.

The schematic of the final 10-switch solution is shown in FIG. 1. Note that each SPDT switch may be implemented in practice by a transfer switch with a termination at the unused port. In this way, every unused TWTA is terminated both at its input and output. The network of FIG. 1 includes the pre-TWTA switch matrix, and also the post-TWTA switch matrix which is the mirror image of the former. Important characteristics of this network are summarized in Tables I and II:

TABLE I

| TWTA # | Channels Spanned | No. of Switch Transits |
| --- | --- | --- |
| 1 | 1, 5, 7 | 2 or 3 |
| 2 | 1, 5, 7 | 2 or 3 |
| 3 | 5, 7, 9 | 2 or 3 |
| 4 | 7, 9 | 2 or 3 |
| 5 | 5, 9 | 2 or 3 |
| 6 | 3, 9 | 2 or 3 |
| 7 | 1, 3 | all 2 |
| 8 | 1, 3 | all 2 |

TABLE II

| Channel # | TWTA # Connectivity |
| --- | --- |
| 1 | 1, 2, 7, 8 |
| 3 | 5, 6, 7, 8 |
| 5 | 1, 2, 3, 5 |
| 7 | 1, 2, 3, 4 |
| 9 | 3, 4, 5, 6 |

What is claimed is:

1. A redundancy system for connecting various combinations of eight available devices 1 through 8 to five channels $A_1$ through $E_9$ comprising, ten switches labeled A, B, C, D, E, C-E, 1-2, 3-4, 5-6 and 7-8, means including switches A, 1-2 and 7-8 connecting channel $A_1$ with device 1, 2, 7 or 8, means including switches B, 5-6 and 7-8 connecting channel $B_3$ with device 5, 6, 7 or 8, means including switches C, C-E, 1-2, 3-4 and 5-6 connecting channel $C_5$ with device 1, 2, 3 or 5, means including switches D, A, 1-2 and 3-4 connecting channel $D_7$ with device 1, 2, 3 or 4, and means including switches E, C-E, B, 3-4 and 5-6 connecting channel $E_9$ with device 3, 4, 5 or 6.

2. A system according to claim 1 wherein said switches are transfer switches.

3. A system according to claim 2 wherein said switches C, D and E have terminations connected to otherwise unused ports to properly terminate unused amplifiers connected to other ports.

4. A system according to claim 1 wherein said switches C, D and E are single-pole-double-throw switches, and the remaining switches are transfer switches.

5. A system according to claim 1 wherein said devices are traveling wave tube amplifiers.

* * * * *

UNITED STATES PATENT AND TRADEMARK OFFICE
CERTIFICATE OF CORRECTION

PATENT NO. : 4,198,611

DATED : April 15, 1980

INVENTOR(S) : Kai Yin Eng

It is certified that error appears in the above-identified patent and that said Letters Patent is hereby corrected as shown below:

Column 1, line 24, "ssal" should be ---Assal---.

Column 2, lines 16 and 17, the words "manufactured by Transco Products, Inc. 4241 Glencoe Avenue, Venice, CA 90291." should be cancelled and inserted instead after "switches" in line 20 of column 2.

Signed and Sealed this

Twenty-second Day of July 1980

[SEAL]

Attest:

SIDNEY A. DIAMOND

Attesting Officer

Commissioner of Patents and Trademarks